US008949105B2

(12) United States Patent
Jacobus et al.

(10) Patent No.: US 8,949,105 B2
(45) Date of Patent: Feb. 3, 2015

(54) HARDWARE INTERFACE BOARD FOR CONNECTING AN EMULATOR TO A NETWORK (75) Inventors: William Eugene Jacobus, Woodbury, MN (US); Robert John Bloor, Royston (GB)

(73) Assignee: Mentor Graphics Corporation, Wilsonville, OR (US)

( * ) Notice: Subject to any disclaimer, the term of this patent is extended or adjusted under 35 U.S.C. 154(b) by 59 days.

(21) Appl. No.: 11/818,163

(22) Filed: Jun. 12, 2007

(65) Prior Publication Data
US 2008/0221860 A1 Sep. 11, 2008

Related U.S. Application Data (63) Continuation of application No. PCT/EP2007/052242, filed on Mar. 9, 2007.

(51) Int. Cl.
*G06F 9/455* (2006.01)
*H04L 12/26* (2006.01)
*G06F 13/10* (2006.01)
*H04L 29/06* (2006.01)

(52) U.S. Cl.
CPC ............... *H04L 43/50* (2013.01); *G06F 9/455* (2013.01); *G06F 13/105* (2013.01); *H04L 69/12* (2013.01)
USPC .............................................. 703/25; 703/23

(58) Field of Classification Search
CPC ........................................................ G06F 9/455
USPC .......................................................... 703/25
See application file for complete search history.

(56) References Cited

U.S. PATENT DOCUMENTS

| 4,788,657 | A | * | 11/1988 | Douglas et al. | 710/104 |
|---|---|---|---|---|---|
| 4,792,896 | A | * | 12/1988 | Maclean et al. | 703/25 |
| 5,307,459 | A | * | 4/1994 | Petersen et al. | 709/250 |
| 5,475,624 | A | * | 12/1995 | West | 703/15 |
| 5,812,530 | A | * | 9/1998 | Fernandez et al. | 370/250 |
| 5,911,059 | A | * | 6/1999 | Profit, Jr. | 703/23 |
| 5,938,754 | A | | 8/1999 | Edwards | |
| 6,389,379 | B1 | * | 5/2002 | Lin et al. | 703/14 |

(Continued)

FOREIGN PATENT DOCUMENTS

WO WO2004/015921 2/2004

OTHER PUBLICATIONS

International Search Report and Written Opinion for PCT/EP2007/052242, dated Aug. 6, 2007, 10 pages.

*Primary Examiner* — Akash Saxena (57) ABSTRACT

A disclosed interface between an emulator and a network that is readily scalable. In one aspect, a scalable solution is achieved through a hardware interface board positioned between the network and the emulator to allow proper transfer there between. A computer is separated from and coupled to the hardware interface board and provides the necessary control signals. Because it is done in hardware separated from the computer, the interface board is readily scalable through the simple addition of network chip sets. In another aspect, the interface board can be placed in two modes of operation, a live test mode and a direct test mode. In yet another aspect, packet formats may be changed on the interface board so that it appears to the emulator as if the network is operating at a different data transfer speed than is actually the case.

13 Claims, 8 Drawing Sheets

(56) References Cited

U.S. PATENT DOCUMENTS

| | | |
|---|---|---|
| 7,050,962 B2 * | 5/2006 | Zeidman .................. 703/24 |
| 2002/0101824 A1 | 8/2002 | Ziedman |
| 2003/0198242 A1 * | 10/2003 | Zeidman .................. 370/428 |
| 2003/0225564 A1 * | 12/2003 | Zeidman .................. 703/23 |
| 2004/0237062 A1 * | 11/2004 | Zeidman et al. ............ 717/100 |
| 2004/0254906 A1 * | 12/2004 | Shei et al. ................ 706/921 |
| 2007/0016396 A9 * | 1/2007 | Zeidman .................. 703/23 |
| 2007/0177495 A1 * | 8/2007 | Ametsitsi .................. 370/208 |

* cited by examiner

HARDWARE INTERFACE BOARD FOR CONNECTING AN EMULATOR TO A NETWORK

CROSS REFERENCE TO RELATED APPLICATION

This application is a continuation of co-pending International Patent Application No. PCT/EP2007/052242, filed Mar. 9, 2007, which is hereby incorporated by reference.

FIELD OF THE INVENTION

The present invention generally relates to the hardware emulators, and, more particularly, to connecting a hardware emulator to a network.

BACKGROUND

Today's sophisticated SoC (System on Chip) designs are rapidly evolving and nearly doubling in size with each generation. Indeed, complex designs have nearly exceeded 50 million gates. This complexity, combined with the use of devices in industrial and mission-critical products, has made complete design verification an essential element in the semiconductor development cycle. Ultimately, this means that every chip designer, system integrator, and application software developer must focus on design verification.

Hardware emulation provides an effective way to increase verification productivity, speed up time-to-market, and deliver greater confidence in the final SoC product. Even though individual intellectual property blocks may be exhaustively verified, previously undetected problems appear when the blocks are integrated within the system. Comprehensive system-level verification, as provided by hardware emulation, tests overall system functionality, IP subsystem integrity, specification errors, block-to-block interfaces, boundary cases, and asynchronous clock domain crossings. Although design reuse, intellectual property, and high-performance tools all help by shortening SoC design time, they do not diminish the system verification bottleneck, which consumes 60-70% of the design cycle. As a result, designers can implement a number of system verification strategies in a complementary methodology including software simulation, simulation acceleration, hardware emulation, and rapid prototyping. But, for system-level verification, hardware emulation remains a favorable choice due to superior performance, visibility, flexibility, and accuracy.

A short history of hardware emulation is useful for understanding the emulation environment. Initially, software programs would read a circuit design file and simulate the electrical performance of the circuit very slowly. To speed up the process, special computers were designed to run simulators as fast as possible. IBM's Yorktown "simulator" was the earliest (1982) successful example of this—it used multiple processors running in parallel to run the simulation. Each processor was programmed to mimic a logical operation of the circuit for each cycle and may be reprogrammed in subsequent cycles to mimic a different logical operation. This hardware 'simulator' was faster than the current software simulators, but far slower than the end-product ICs. When Field Programmable Gate Arrays (FPGAs) became available in the mid-80's, circuit designers conceived of networking hundreds of FPGAs together in order to map their circuit design onto the FPGAs and the entire FPGA network would mimic, or emulate, the entire circuit. In the early 90's the term "emulation" was used to distinguish reprogrammable hardware that took the form of the design under test (DUT) versus a general purpose computer (or work station) running a software simulation program.

Soon, variations appeared. Custom FPGAs were designed for hardware emulation that included on-chip memory (for DUT memory as well as for debugging), special routing for outputting internal signals, and for efficient networking between logic elements. Another variation used custom IC chips with networked single bit processors (so-called processor based emulation) that processed in parallel and usually assumed a different logic function every cycle.

Physically, a hardware emulator resembles a large server. Racks of large printed circuit boards are connected by backplanes in ways that most facilitate a particular network configuration. A workstation connects to the hardware emulator for control, input, and output.

Before the emulator can emulate a DUT, the DUT design must be compiled. That is, the DUT's logic must be converted (synthesized) into code that can program the hardware emulator's logic elements (whether they be processors or FPGAs). Also, the DUT's interconnections must be synthesized into a suitable network that can be programmed into the hardware emulator. The compilation is highly emulator specific and can be time consuming.

It is often desirable to connect the circuit being emulated to a live network, such as an Ethernet network. U.S. Pat. No. 7,050,962 and US Publication No. US2003/0225564, both to Zeidman, describe an interface between an emulator, which runs at a slower speed, and a network running at a faster speed. The solution uses a computer coupled between the emulator and the network, wherein the computer receives the faster signals from the network on a port and delivers the signals to the emulator at emulation speeds, and vice versa.

A problem of scaling exists with this solution because computers normally only have one network port. It is possible to add a network card to add some additional ports, but the number of ports is limited. Network switch and router designs being verified in an emulator may require ten, sixteen or twenty ports for connecting to multiple networks. With such a high number of ports, the Zeidman solution may require the addition of ten or more computers, which is not practically feasible. Additionally, it is questionable whether the software described in Zeidman would be able to handle the bandwidth associated with four active network ports coming into a single computer.

Thus, it is desirable to provide a more scalable and cost-effective solution for connecting an emulator to a network.

SUMMARY

A system and method are disclosed to provide an interface between an emulator and a network that is readily scalable.

In one aspect, a scalable solution is achieved through a hardware interface board positioned between the network and the emulator to allow proper transfer there between. A computer is separated from and coupled to the hardware interface board and provides the necessary control signals. Because it is done in hardware separated from the computer, the interface board is readily scalable through the simple addition of network chip sets. Meanwhile, the computer can control the interface board using only a single computer port.

In another aspect, the interface board can be placed in two modes of operation. One is a live test wherein the emulator and network communicate through the interface board, without traversing a computer. A second is a direct test where the network is electrically disconnected from the emulator, and an application program on the computer sends packets directly to the emulator through the interface board.

In yet another aspect, packet formats may be changed on the interface board so that it appears to the emulator as if the network is operating at a different data transfer speed than is actually the case. Thus, additional emulator testability is accomplished.

These features and others of the described embodiments will be more readily apparent from the following detailed description, which proceeds with reference to the accompanying drawings.

DETAILED DESCRIPTION

Figure 1:
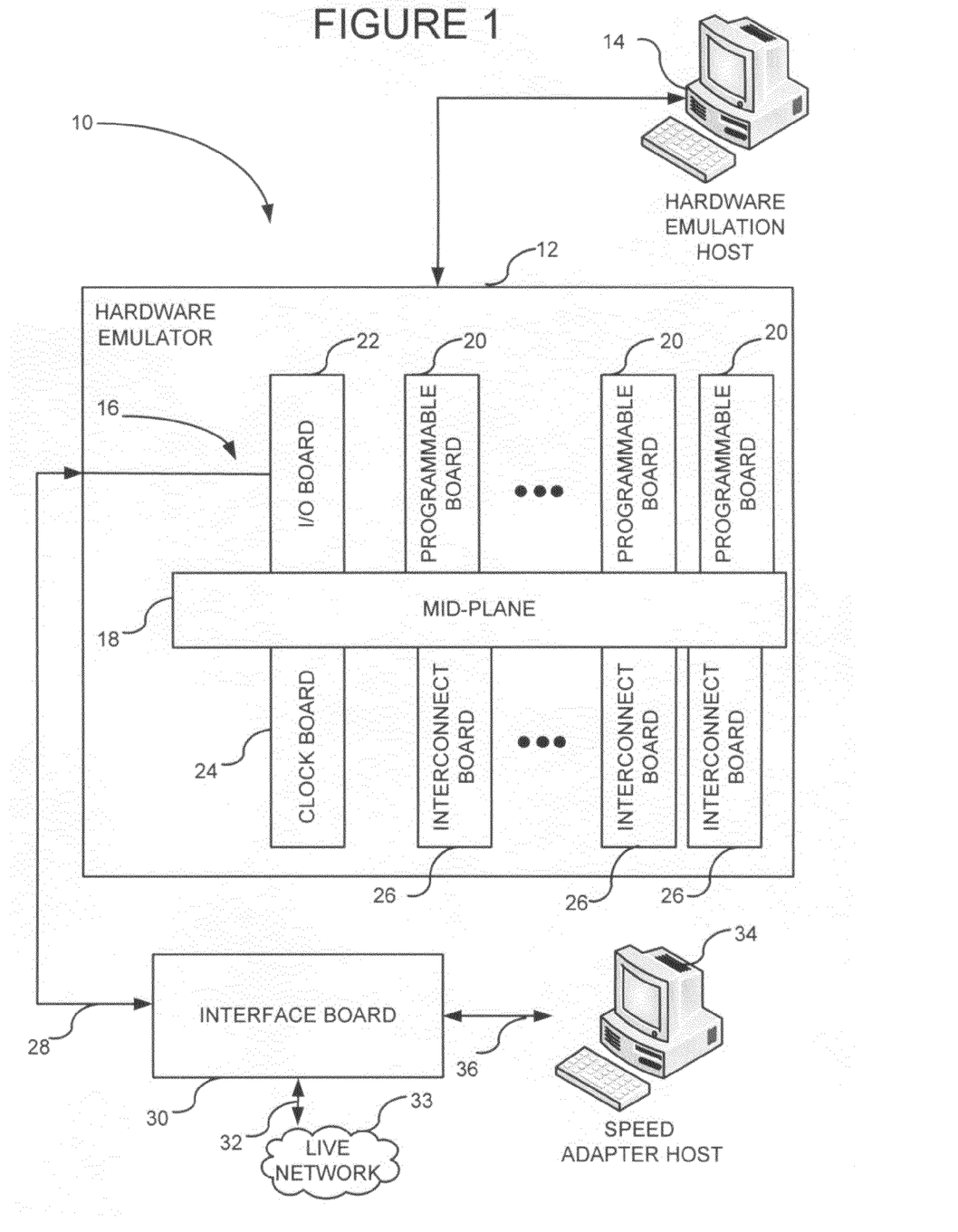
FIG. 1 is a system diagram of a hardware emulator environment with an interface board for connecting to an external network.

FIG. 1 shows an emulator environment 10 including a hardware emulator 12 coupled to a hardware emulator host 14. The emulator host 14 may be any desired type of computer hardware and generally includes a user interface through which a user can load, compile and download a design to the emulator 12 for emulation.

The emulator 12 includes multiple printed circuit boards 16 coupled to a midplane 18. The midplane 18 allows physical connection of the printed circuit boards into the emulator 12 on both sides of the midplane. A backplane may also be used in place of the midplane, the backplane allowing connection of printed circuit boards on one side of the backplane. Any desired type of printed circuit boards may be used. For example, programmable boards 20 generally include an array of FPGAs, or other programmable circuitry, that may be programmed with the user's design downloaded from the emulator host 14. One or more I/O boards 22 allow communication between the emulator 12 and hardware external to the emulator, as further described below. Clock board 24 generates any number of desired clock signals. And interconnect boards 26 allow integrated circuits on the programmable boards 20 to communicate together and with integrated circuits on the I/O boards 22.

The I/O board 22 is coupled, via a cable 28, to an interface board 30 positioned outside of the emulator. The interface board 30 connects the emulator 12 to a live network 33 by a cable 32. By "live network" it is meant the network is active and functional. Any variety of networks may be used, such as Ethernet, USB, Firewire, ADSL, etc. The interface board 30 is also connected to a computer 34 through a cable 36. The computer 34 has software installed thereon so that it can send control signals and network packets to the interface board 30 and also monitor network packets being sent between the live network and the emulator 12.

Figure 2:
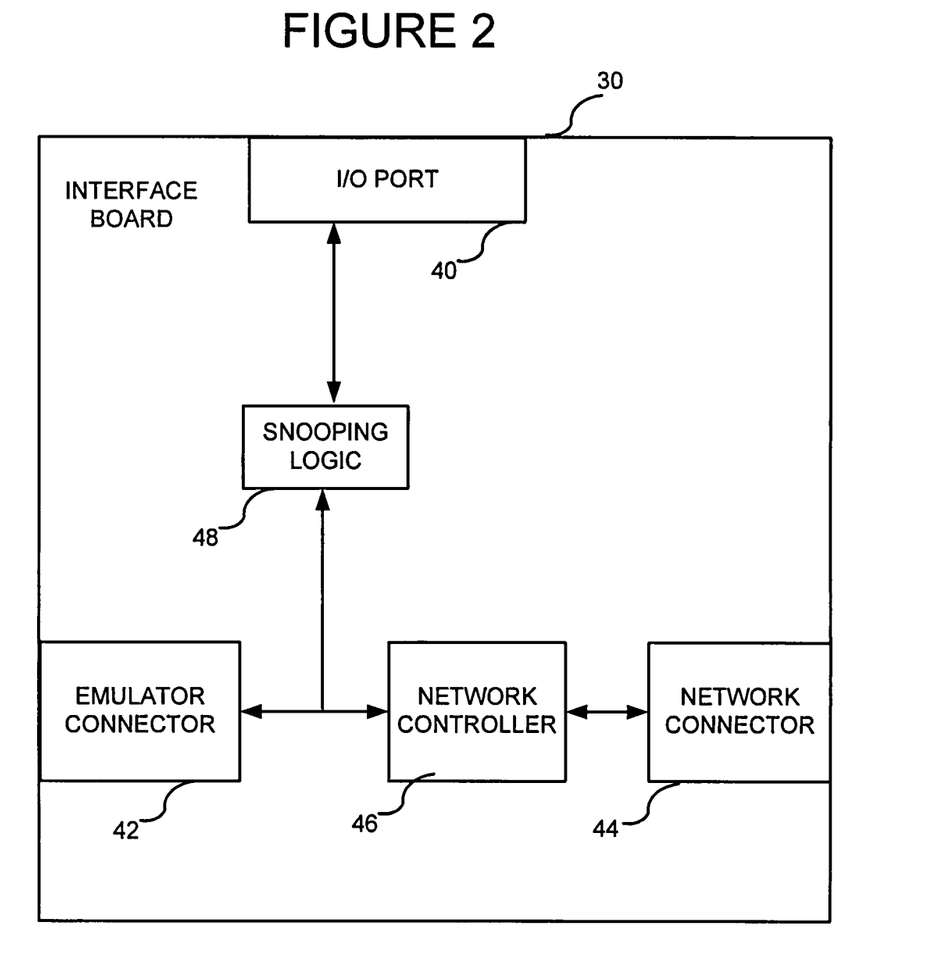
FIG. 2 is a more detailed hardware diagram of the interface board.

FIG. 2 shows an embodiment of the interface board 30. In this embodiment, the interface board includes three different connectors: an I/O port 40, an emulator connector 42, and a network connector 44. The I/O port 40 is used to connect the interface board 30 to the computer 34, as is shown in FIG. 1. Likewise, the emulator connector 42 connects the interface board 30 to the emulator 12 and the network connector 44 connects the interface board 30 to the network 33. It should be recognized that multiple network connectors can be used, giving the board scalability, as is further described below. Coupled between the network connector 44 and the emulator connector 42 is a network controller 46. The network controller 46 is normally an IC that transmits and receives communications from the network 33. Generally, the network controller 46 implements the physical layers of the ISO network model and is thus called a physical layer network controller. For example, in the case where the network is Ethernet, the network controller may be a MAC/PHY controller. Snooping logic 48 is coupled to both the network controller 46 and the emulator connector 42 and monitors communications there between in a well-known manner. The snooping logic 48 then transmits the snooped packets to the I/O port, so that it can be used by the computer 34. In operation, the network packets are received in the network controller 46 via the network connector 44. The network controller 46 has a packet buffer internally and effectively modifies the data speed from the network speed to the emulator speed and vice versa by receiving packets from the network, storing them and providing them to the emulator at the slower emulator speed. For example, when a packet is buffered in the network controller, a flag is set that initiates retrieval of the packet at the emulator speed. It is desirable that the snooping logic 48 is connected between the emulator connector 42 and the network controller 46 because the speed of the transmissions is substantially slower and easier to snoop than on the network connector-side of the network controller.

Figure 3:
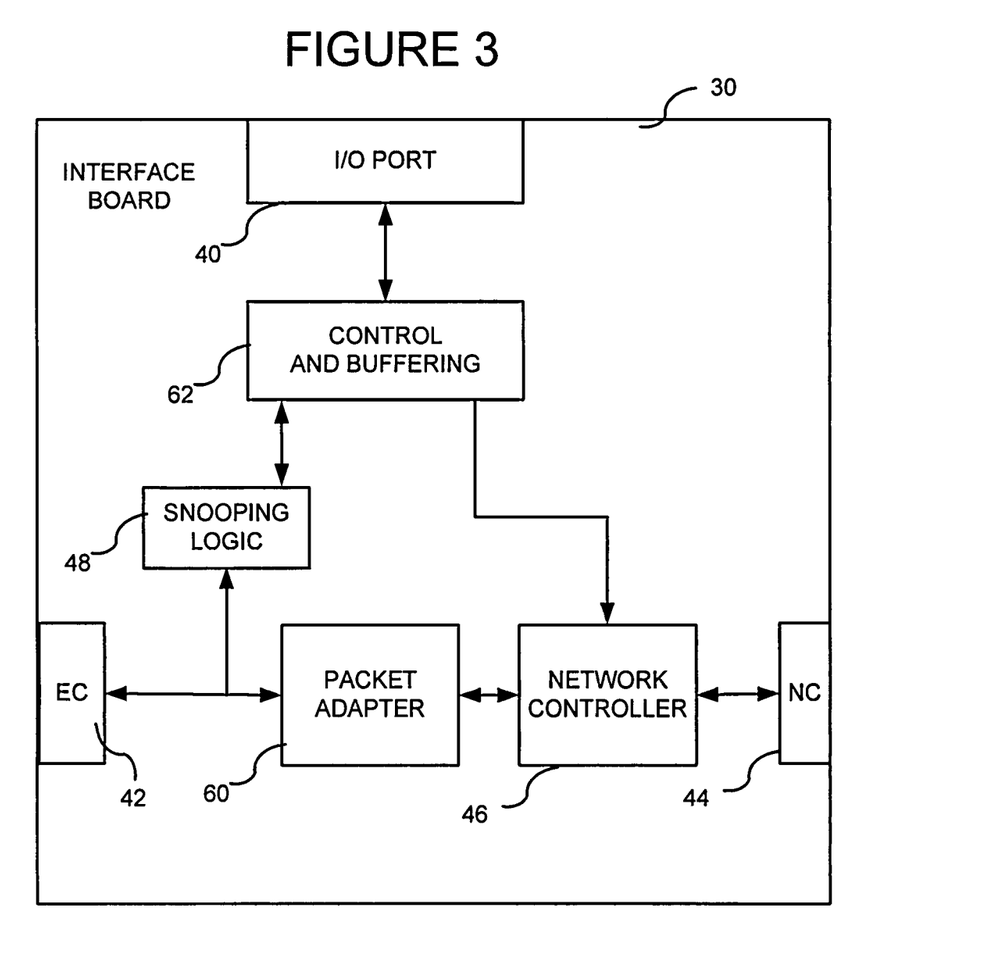
FIG. 3 is another embodiment of the interface board with a packet adapter to modify the format of the packets.

FIG. 3 shows another embodiment of the interface board 30. In this embodiment, there is also the I/O port 40, the emulator connector 42 (shown as EC), and the network connector 44 (shown as NC). The physical layer network controller 46 and the snooping logic 48 are also already described in relation to FIG. 2. A packet adapter 60 is coupled between the network controller 46 and the emulator connector 42. The packet adapter 60 receives a packet, modifies the packet format so that the packet is in a format associated with a different data speed, and retransmits the packet. The packet adapter 60 is different depending on the network used. For example, with Ethernet, the packet adapter 60 can change MII format to either GMII or XGMII and vice versa. Effectively, this changes the appearance of the data speed from 10 or 100 Megabits per second to a format that is 1 or 10 Gigabits per second or vice versa. The packet adapter can be used to adapt the format of a packet associated with any data speed. The emulator 12 normally operates at only 1-3 MHz. However, the packets received from the packet adapter 60 have the format as if the data speed is several magnitudes higher, so that a proper test of the emulated design is performed. A control and buffering block 62 is coupled between the I/O port 40 and the snooping logic 48. The buffering part of the block 62 is used to buffer data snooped from the snooping logic 48 so that it can be transmitted via the I/O port 40 to the computer 34. The control part of block 62 contains a register (not shown) that is writable from the computer 34. The register is coupled to the network controller 46 in order to configure the network controller for the proper mode of operation. For example, the controller is configured to a specific MAC address and setup to operate in a promiscuous manner where all incoming packets are passed to the interface board 30. Additionally, the controller is configured to contain a particular size of receive and transmit buffer.

Figure 4:
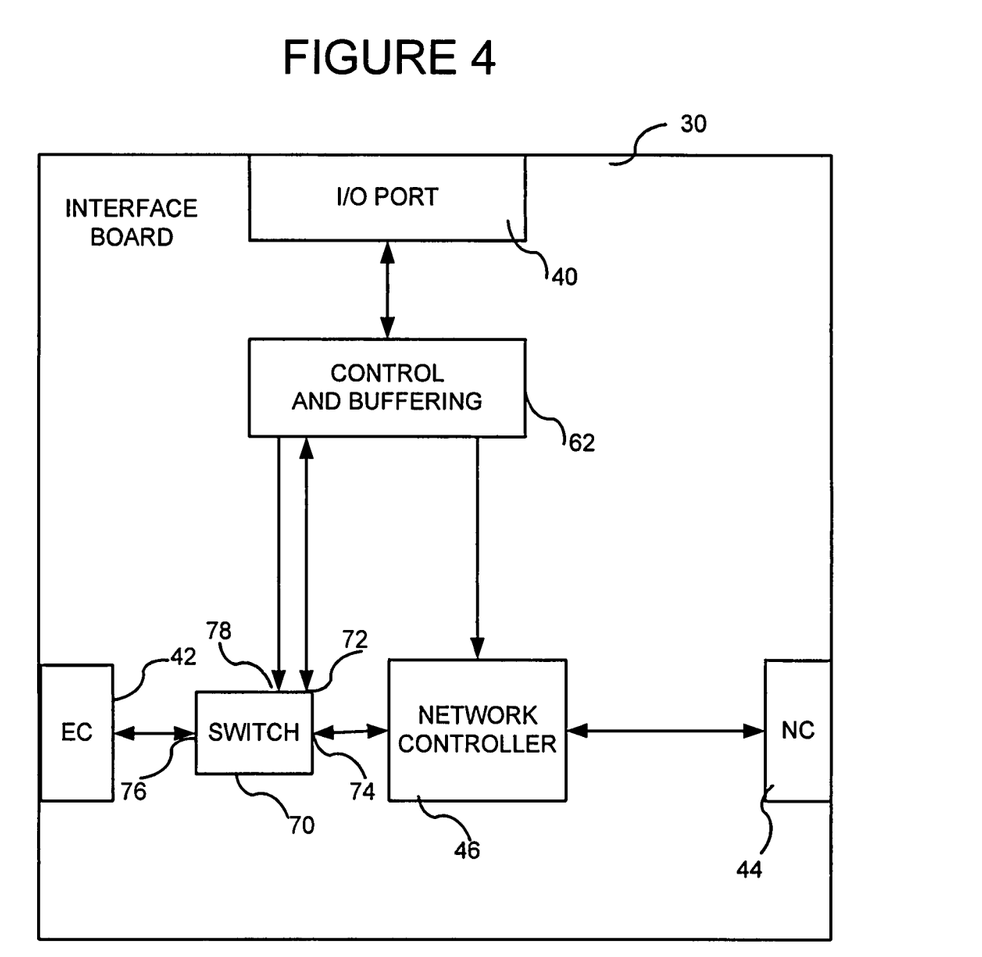
FIG. 4 is another embodiment of the interface board showing a switch to dynamically select either a direct test mode or a live network test mode.

FIG. 4 shows another embodiment of the interface board 30. In this embodiment, each of the connectors 40, 42, and 44 are the same as already described. Additionally, the physical layer network controller 46 and the control and buffering 62 are the same as previously described. A switch 70 is coupled between the network controller 46 and the emulator connector 42. The switch 70 has three data terminals 72, 74, 76 and a control input 78. The switch 70 is bidirectional so that terminal 76 is either electrically coupled to terminal 72 or terminal 74. More specifically, the switch 70 either electrically couples the network controller 46 to the emulator connector 42 or electrically couples the control and buffering 62 and the emulator connector 42. Thus, in one mode of operation with terminals 74 and 76 electrically connected, the emulator 12 is electrically connected to the network 33 and can receive and send packets to the active (or live) network. In a second mode of operation, the terminals 72 and 76 are electrically connected and the network is electrically disconnected. In this second mode, the computer 34 can receive and send packets to the emulator 12. More specifically, the computer 34 transmits control information into a register within the control and buffering block 62. This control information sets the control input 78 to the switch 70 in the first mode or second mode as described above. If in the second mode, the computer 34 sends packets to the control and buffering block 62 and those packets are automatically forwarded or retransmitted to the emulator 12 via the switch 70. Likewise, the emulator 12 can send packets to the computer 34 so that direct testing of the design in the emulator occurs via the computer.

Figure 5:
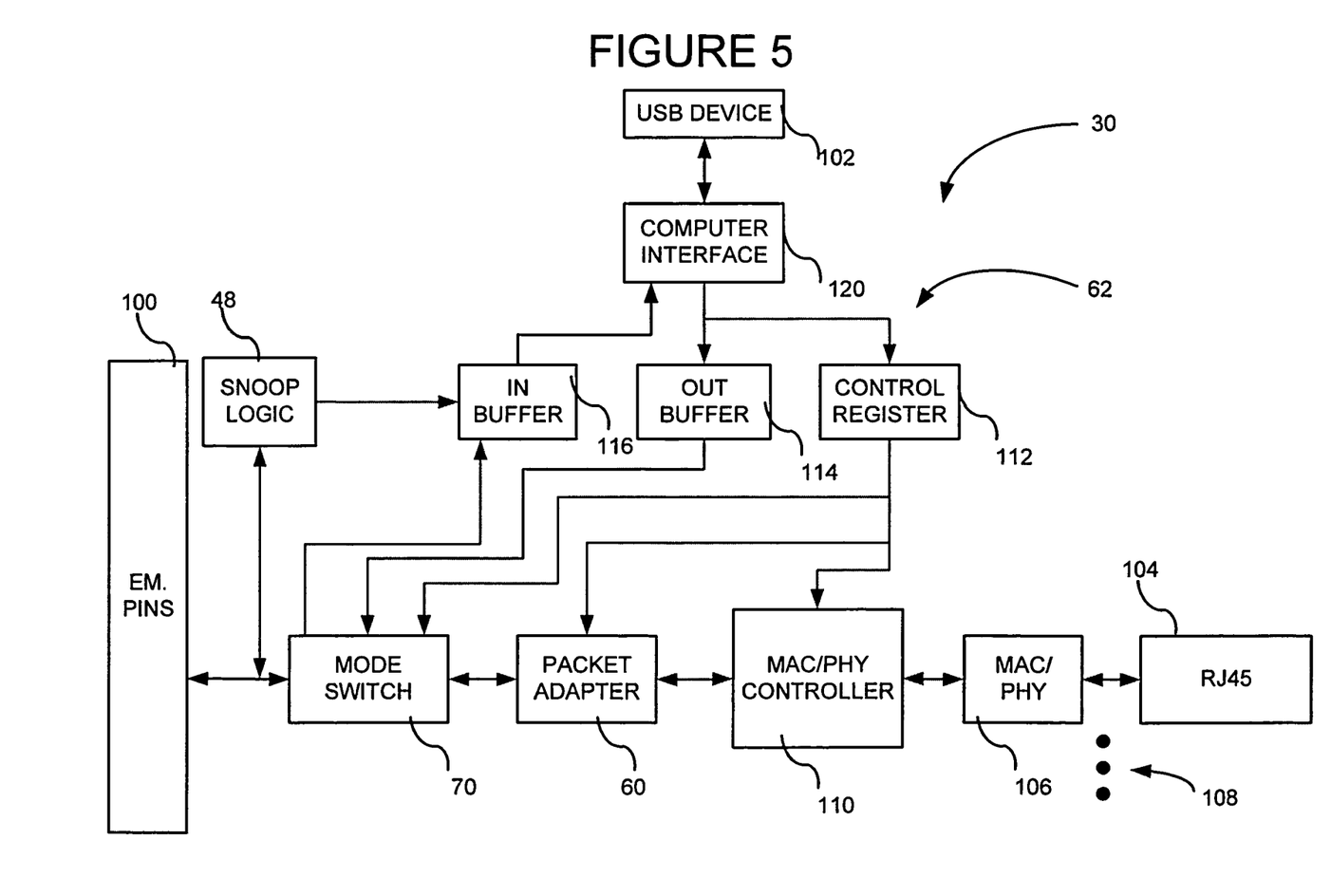
FIG. 5 is a detailed hardware diagram of a specific application of the interface board.

FIG. 5 shows a particular embodiment of the interface board 30 wherein the network is an Ethernet network. Emulator pins 100 are used to connect a cable to the emulator 12. Universal Serial Bus (USB) device 102 is a standard interface used for connecting to the computer 34. RJ45 connector 104 is a standard Ethernet connector and is used to connect the interface board 30 to the Ethernet-based network. A standard MAC/PHY transceiver 106 is coupled to the connector 104 to create the necessary interface needed to communicate with an Ethernet network. As shown at 108, the combination of transceiver 106 and connector 104 can be repeated multiple times and connected to a MAC/PHY controller 110, which configures and controls the physical layer devices. The controller 110 provides a level of interface between the packet adapter 60 and the individual MAC/PHY devices 106, such that they can be individually configured and controlled as desired. In this embodiment, the packet adapter 60 is a MII, GMII, XGMII adapter. Inside the emulator there are either one or two modules called NULL-Phy's that have a simple synchronous interface comprising a clock, data and control. If two NULL-Phy modules exist, then a common clock may be used. The MII, GMII, XGMII Adapter is configured by the computer 34 such that, in Live Network mode, the data transmitted to the emulator is in the correct format to be consumed by the NULL-Phy's in the emulator and the data received from the emulator is translated into the correct format to be passed to the MAC/Phy Interface. The switch 70 and snoop logic 48 have already been described above. The control and buffering 62 in this embodiment includes an output buffer 114 and an input buffer 116, both coupled to the switch 70. A computer interface 120 is coupled between the buffers 114, 116 and the USB device 102. The computer interface may be a USB peripheral controller (e.g., Cypress FX2 device and associated interface logic). Together with the software on computer 34, the USB peripheral controller is responsible for all the data transfers between the host and the emulator. The buffers 114, 116 may be FIFOs to buffer data transferred to and from the computer 34 and the emulator. The computer interface 120 controls the data submitted to the out buffer 114 for transmission to the emulator. Additionally, the computer interface 120 takes data from the in buffer 116 and passes it onto the computer 34. Register 112 is a set of registers that are written or read by the software on the computer 34 in order to setup and control modes and operations in the emulator. The primary functions of the register 112 are as follows:

1) selection between Directed Test and Live Network mode;
2) selection of the format of the data transfer speed (MII, GMII, XGMII) in Live Network mode;
3) providing configuration and status of the MAC/PHY controller 110 through indirect access to the registers and FIFOs internal to those devices.

The ability to have one MAC/PHY controller 110 coupled to multiple transceivers 106 and RJ45 connectors 104 makes the solution very scalable. For example, 10, 16, or even 20 transceiver/RJ45 pairs can be added. Additionally, only one port on computer 34 needs to be used in order control the interface board 30. Thus, one computer using one port can effectively control multiple network connections to the emulator. If desired, the solution can be further scaled by using additional ports and/or additional interface boards and/or additional computers. A practical solution is to have four transceiver/RJ45 pairs per board connected to a MAC/PHY controller. If additional network connections are needed, additional interface boards can be added in parallel. The interface board 30 can easily handle the transactions from four network connections. Unlike the prior systems, the network traffic passes directly through the interface board 30 to the emulator without the need to go through a computer, which would slow the transmissions. Additionally, with multiple networks connected, the computer 34 can selectively monitor the network connections by simply choosing which transmissions to include from the snoop logic in the visibility software provided to the user.

Figure 6:
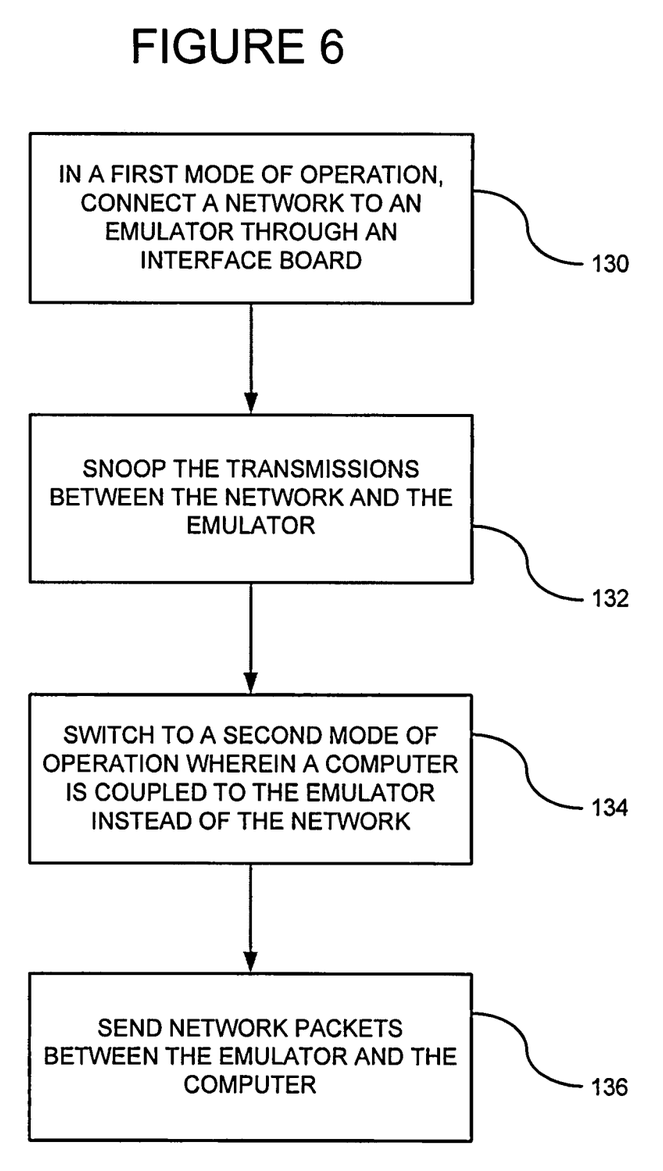
FIG. 6 is a flowchart of a method for switching between the direct test mode and the live network test mode.

FIG. 6 shows a flowchart of a method for switching between a direct test mode and a live network mode. In process block 130, in a first mode of operation (called a Live Network mode), a network is coupled to the emulator 12 through the interface board 30. In process block 132, the transactions between the network and the emulator are snooped so that the computer 34 can monitor the network transactions. In process block 134, the interface board 30 is switched to a second mode of operation wherein the computer 34 is coupled to the emulator instead of the network. Returning briefly to FIG. 5 as an example, this switching can be accomplished by the computer 34 writing to the control register 112. The control register 112 has an output coupled to the switch 70 for changing the mode of operation. In process block 136, the computer 34 then sends network packets to the emulator directly to test the design in the emulator. Additionally, network packets from the emulator are sent back to the computer. The interface board 30 can be switched back and forth to the different modes when desired.

The method of FIG. 6 can be used for error injection into a network communication. For example, the computer 34 can monitor a transaction between the network and the emulator 12 in the first mode of operation. At a predetermined point in time in the transaction, the computer 34 can switch the interface board 30 to the second mode of operation. At that point, the computer 34 can inject an error packet and switch back to the first mode of operation so the computer 34 can then watch the result of the error injection.

Figure 7:
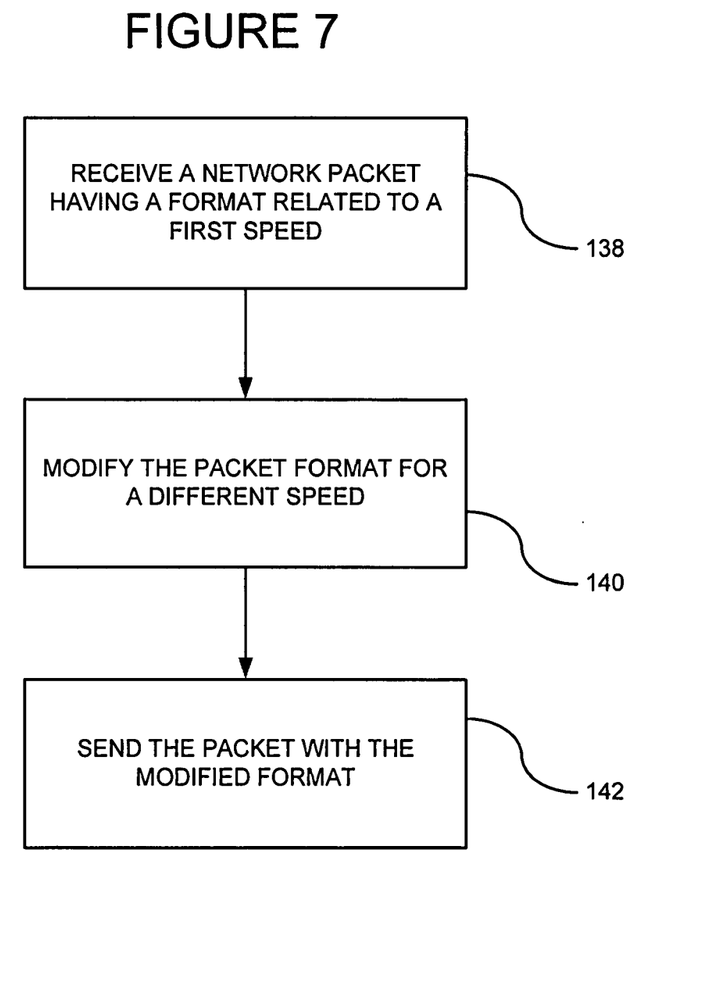
FIG. 7 is a flowchart of a method for modifying the packet format of communications between the emulator and the network.

FIG. 7 shows a flowchart of a method for modifying the packet format. In process block 138, a network packet is received in a format related to a first data speed. For example, the packet adapter 60 may receive a packet from the network in a format MII, which is either 10 or 100 Megabits per second. In process block 140, the interface board adapts the packet format to be GMII or XGMII for 1 or 10 Gigabits per second. Likewise, the interface board may switch from the faster speeds to the slower speeds. In process block 142, the packet with the modified packet format is transmitted towards the desired destination, which is either the emulator 12 or network 33.

Figure 8:
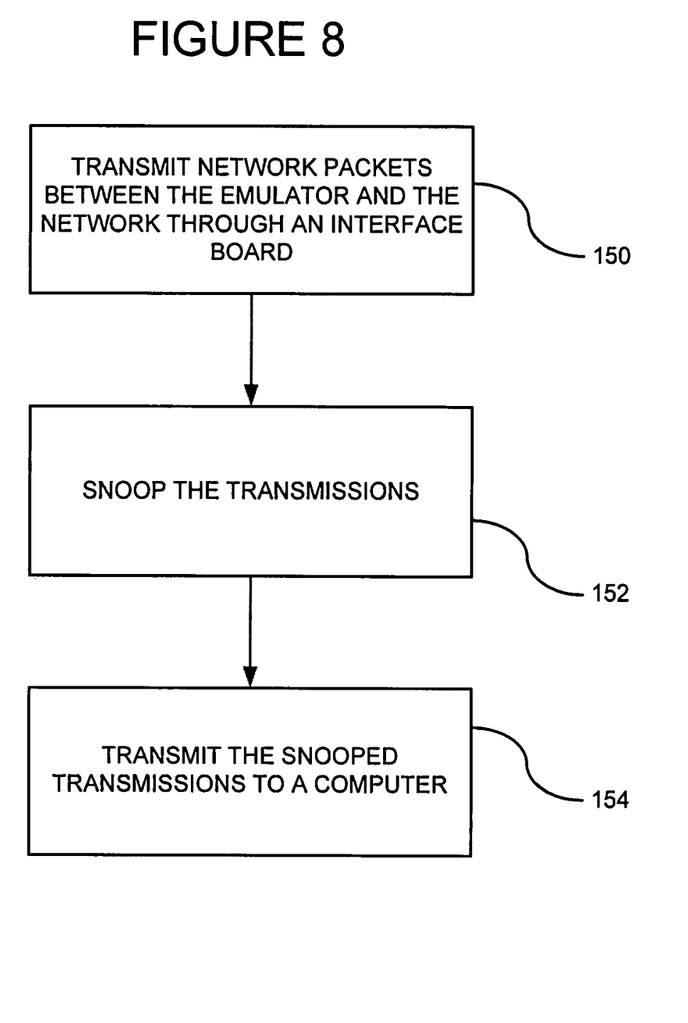
FIG. 8 is a flowchart of a method for snooping packets transmitted between the emulator and the network.

FIG. 8 is a flowchart of a method for transmitting packets between an emulator and a network. In process block 150, network packets are transmitted between the emulator 12 and the network 33 through a through an interface board 30. In process block 152, the transmissions are snooped by the snoop logic 48 on the interface board. In process block, 154, the snooped transmissions are transmitted to the computer 34.

Having illustrated and described the principles of the illustrated embodiments, it will be apparent to those skilled in the art that the embodiments can be modified in arrangement and detail without departing from such principles.

Although only one computer 34 is shown, multiple computers can be used with any of the embodiments described herein connected to one or more interface boards as already described.

Additionally, the interface board 30 can be inserted inside the emulator if desired.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

The invention claimed is:

1. A device comprising:
a hardware interface board configured to couple between a network and a hardware emulator, wherein the hardware interface board comprises:
an emulator connector configured to couple to the hardware emulator;
a network connector configured to connect to the network;
an input/output port configured to couple to a separate computer;
a physical layer network controller coupled between the network connector and the emulator connector, wherein the physical layer network controller is configured to modify a data speed of network packets transmitted between the network via the network connector and the hardware emulator via the emulator connector; and
snoop logic configured to send the network packets being transmitted between the network and the hardware emulator to the separate computer via the input/output port.

2. The device of claim 1, wherein the separate computer is configured to monitor emulation speed network traffic via the snoop logic and provide visibility of that emulation speed network traffic.

3. The device of claim 1, wherein the input/output port comprises a universal serial bus controller.

4. The device of claim 1, further comprising a packet adapter coupled between the physical layer network controller and the emulator connector, the packet adapter configured to alter a format of the network packets transmitted between the network via the network connector and the hardware emulator via the emulator connector.

5. The device of claim 1, wherein the physical layer network controller comprises a physical interface transceiver.

6. The device of claim 5, wherein the physical interface transceiver is configured to connect to an Ethernet-based network.

7. The device of claim 1, wherein the hardware interface board further comprises a switch having:
a first terminal coupled to the physical layer network controller,
a second terminal coupled to the input/output port, and
a third terminal coupled to the emulator connector, the switch configured to selectively connect the first and third terminals or the second and third terminals.

8. The device of claim 7, further comprising a memory buffer coupled between the switch and the input/output port.

9. The device of claim 1, wherein the physical layer network controller is a MAC/PHY interface.

10. The device of claim 1, further comprising a control register coupled between the input/output port and the physical layer network controller, the control register being writeable from the separate computer, which configures the physical layer network controller.

11. The device of claim 1, wherein the network has a faster data transfer speed than the emulator.

12. An apparatus comprising:
a hardware interface board configured to couple between a network and an emulator, wherein the hardware interface board comprises:
an emulator connector configured to couple to the emulator;
a network connector configured to couple to the network;
an input/output port configured to couple to a separate computer;
means for modifying a speed of packets transmitted between the emulator and the network, wherein the means for modifying is coupled between the emulator connector and the network connector; and
means for snooping the transmissions of the packets between the emulator connector and the network connector, wherein the means for snooping is configured to transmit the snooped network packets to the separate computer via the input/output port.

13. The apparatus of claim 12 wherein the hardware interface board further comprising means for transmitting packets between the separate computer and the emulator.

* * * * *